United States Patent [19]
Serrano

[11] 3,854,039
[45] Dec. 10, 1974

[54] CURRENT TRANSMITTER CIRCUITRY TO PROVIDE AN OUTPUT VARYING AS THE SQUARE ROOT OF A MEASURED VARIABLE CONDITION

[75] Inventor: Leonardo V. Serrano, Minneapolis, Minn.

[73] Assignee: Rosemont Inc., Eden Prairie, Minn.

[22] Filed: Apr. 30, 1973

[21] Appl. No.: 355,816

[52] U.S. Cl. .......................... 235/193.5, 235/151.34
[51] Int. Cl. .............................................. G06g 7/20
[58] Field of Search............ 235/193.5, 151.34, 194; 328/144; 73/205

[56] References Cited
UNITED STATES PATENTS

| | | |
|---|---|---|
| 3,016,197 | 1/1962 | Newbold ...................... 235/151.34 |
| 3,043,516 | 7/1962 | Abbott et al. .................... 328/144 X |
| 3,328,569 | 6/1967 | Brewster ......................... 328/144 X |
| 3,496,346 | 2/1970 | Asai et al. ........................ 235/193.5 |
| 3,679,884 | 7/1972 | Figueroa .......................... 235/193.5 |

*Primary Examiner*—Joseph F. Ruggiero
*Attorney, Agent, or Firm*—Dugger, Johnson & Westman

[57] ABSTRACT

A transmitter used in a variable parameter process which provides a current signal varying as the square root of the measured variable and is also particularly applicable to such transmitters of the "two-wire" type where the transmitter supply current is controlled by the transmitter to vary as a function of the variable parameter.

23 Claims, 3 Drawing Figures

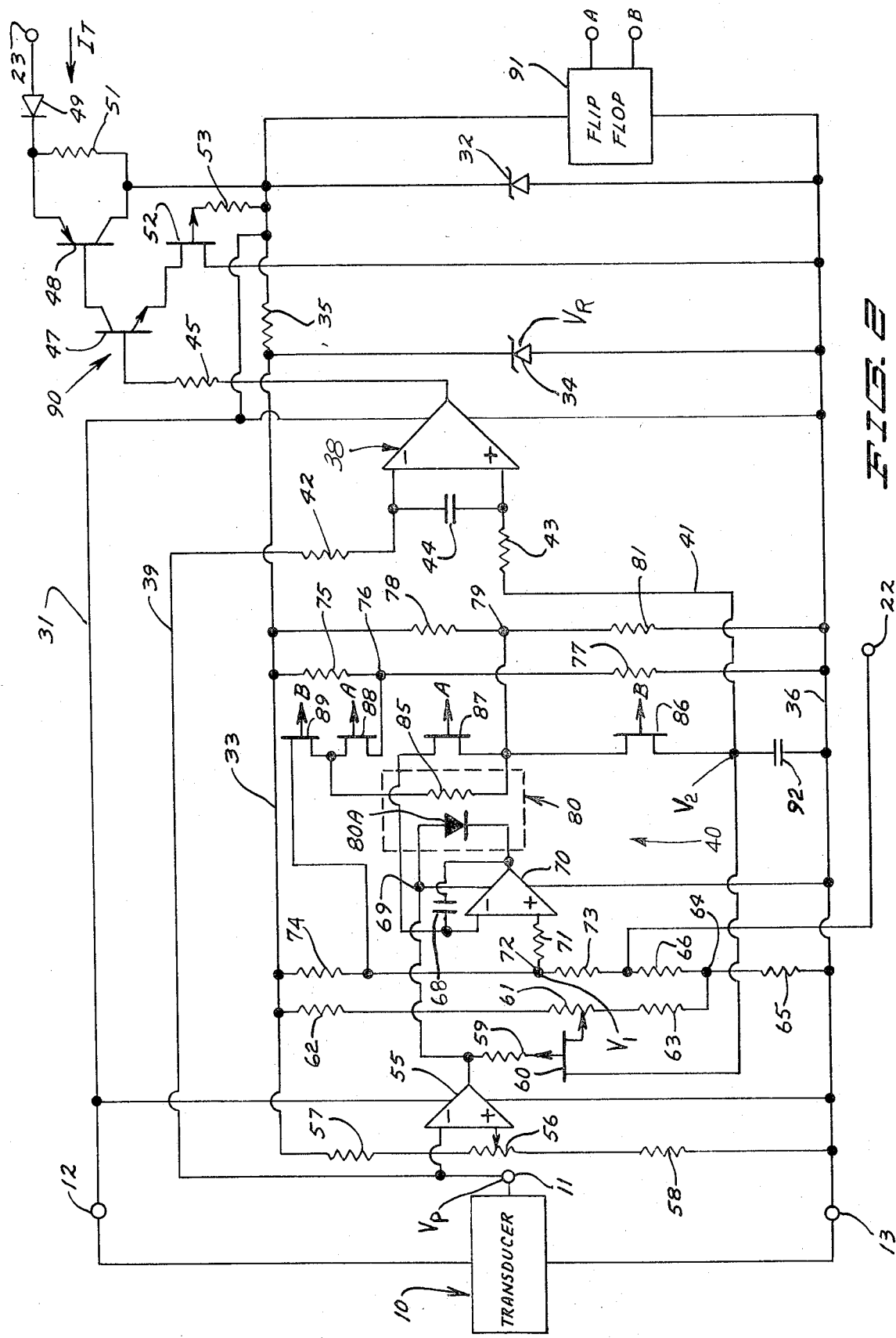

CURRENT TRANSMITTER CIRCUITRY TO PROVIDE AN OUTPUT VARYING AS THE SQUARE ROOT OF A MEASURED VARIABLE CONDITION

BACKGROUND OF THE INVENTION

1. Field of the Invention

This invention relates to a transmitter which provides a signal varying as the square root of an input signal.

2. Prior Art

In flow measurement transmitters, circuits which deliver a signal that is proportional to the square root of an input parameter are known. Such circuits are shown and described in U.S. Pat. No. 3,496,346, issued to Isao Asai et al. on Feb. 17, 1970 and U.S. Pat. No. 3,539,792, Issued to C. H. Gebo on Nov. 10, 1970. The circuits shown in these patents receive a linear input signal and provide an output signal varying as the square root of the input signal. However, the complexity and power requirements of these circuits limit the suitability of such circuits for use with current transmitters, and especially limits their use with two-wire transmitter.

SUMMARY OF THE INVENTION

This invention comprises an electrical circuit having an input which controls an output signal to vary as the square root of the input signal to the circuit. The output signal is sampled and squared and then compared to the input signal. An output signal controller responds to a control signal produced by this comparision to vary the output signal to reduce any difference between the squared signal and the input signal to zero and in this manner the output signal provides a square root extraction of the input signal change. The circuit operates on sufficiently low power to operate the square root extraction in a 4–20 ma range two-wire transmitter. An additional feature includes a switch which connects in circuitry for providing an output signal which is linear with respect to the input at low signal levels to give improved stability near zero input signals.

As shown, the output signal is a current signal and the transmitter is of the two-wire type wherein a DC source and load are connected to the two wires to provide power and receive the output signal.

BRIEF DESCRIPTION OF THE DRAWINGS

FIG. 1 is a block diagram drawing schematically showing the elements of the invention in a two-wire transmitter circuit;

DESCRIPTION OF THE PREFERRED EMBODIMENT

Figure 2:
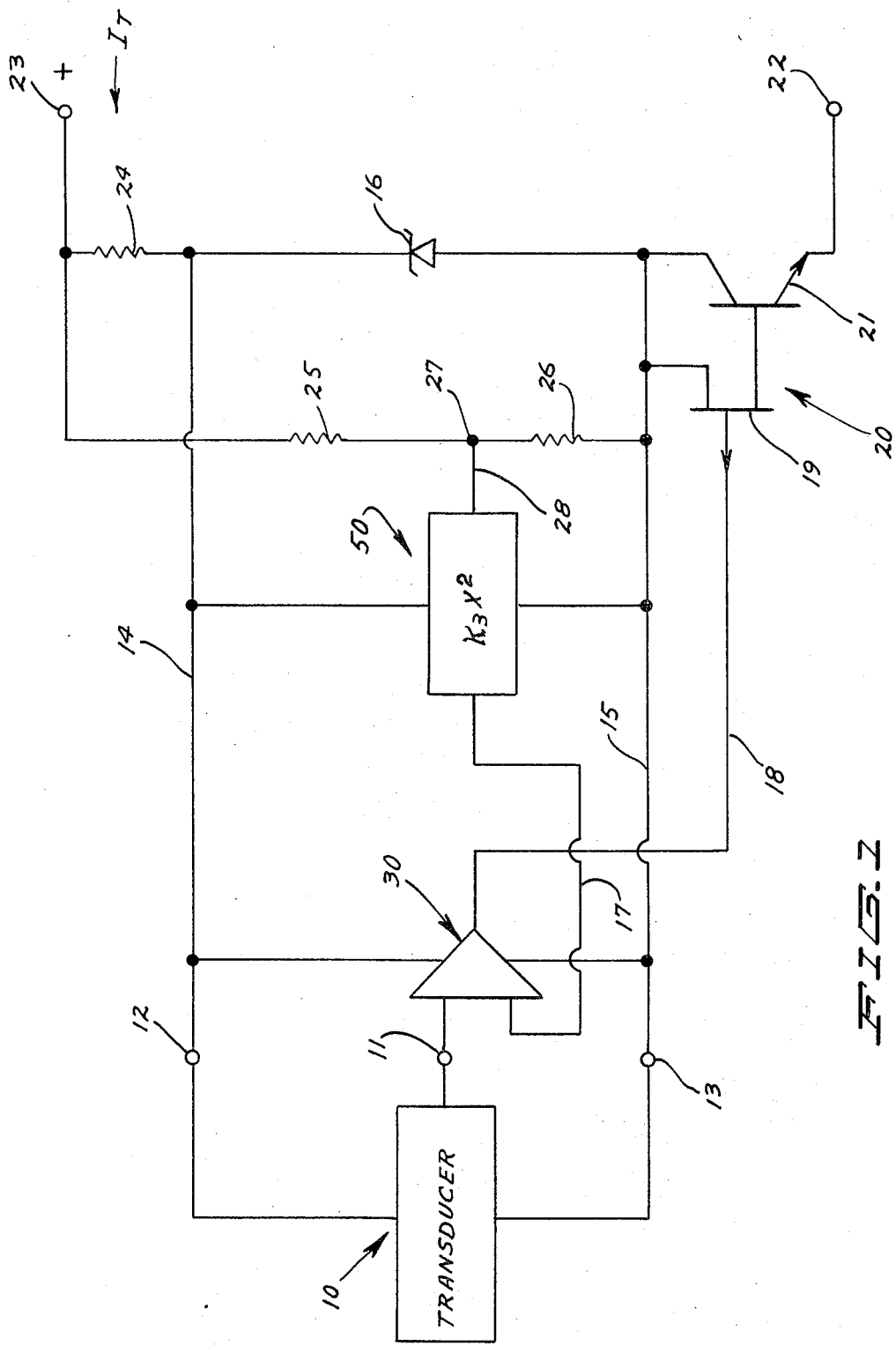
FIG. 2 is a schematic representation of details of a preferred form of the circuit.

Referring to FIGS. 1 and 2, a transducer indicated at 10 comprises a device which provides an output voltage at terminal 11 which is a function of a variable condition being measured. As shown the transducer is energized solely through input terminals 12 and 13 for operation in a two-wire transmitter, although in general the transducer could receive additional power from another source which is not shown. In FIG. 1 a differential input comparison amplifier is indicated at 30 and a squaring circuit is indicated generally at 50, both of which are energized from line 14 with power return to line 15. A Zener diode 16 connected between lines 14 and 15 serves to stabilize the voltage at a constant value between these lines. Amplifier 30 compares the output signal from transducer 10 at terminal 11, which is connected to one input of the amplifier, to an output signal from squaring circuit 50 which is delivered on a line 17 to the other input terminal of amplifier 30.

The amplifier 30 provides an output signal on a line 18 to the gate of a field effect transistor (FET) 19. The source of FET 19 connects to line 15 and the drain connects to the base of a transistor 21. Transistor 21 has its collector connected to line 15 and its emitter connected to a power return terminal 22. Transistors 19 and 21 comprise a current control amplifier 20, connected so that the total current $I_T$ flowing from a current terminal 23 to power return terminal 22 is controlled in response to the amplifier output signal on line 18. A feedback resistor 24 is connected between current terminal 23 and line 14 and carries most of the current $I_T$ which flows between terminals 23 and 22. The remaining current flows through the series combination of resistors 25 and 26 connected between terminal 23 and line 15. A junction 27 between resistors 25 and 26 is connected to the input of squaring circuit 50 by line 28. The squaring circuit 50 receives operation power by connection to lines 14 and 15.

A typical application of the circuit of FIG. 1 is for a flow measurement where transducer 10 is a differential pressure device providing a voltage signal $V_P$ at terminal 11 which is a voltage level measured relative to a voltage that is midway between the voltage between lines 14 and 15. $V_P$ has the characteristic form $V_P = k_1 \Delta P$ where $\Delta P$ is differential pressure across an orifice, which varies as the square of flow velocity through the orifice, and $k_1$ is a constant. An external DC power supply and indicating instrument such as a recorder (not shown) are connected across terminals 22 and 23.

In a typical transducer a range of current $I_T$ is 4 to 20 ma. Resistors 24, 25 and 26 are selected so that the voltage $V_1$ at junction 27 is related to current $I_T$ by the expression $V_1 = k_2(I_T - 4)$ where $k_2$ is a constant. Voltage $V_1$ is squared (multiplied by its own value) in circuit 50. The output voltage on line 17 is thus represented as $V_0$ where $V_0 = k_4(I_T - 4)^2$ and $k_4$ is a constant. Amplifier 30 responds to a voltage between terminal 11 and line 17, which are connected to the amplifier input terminals, to change the current through current control amplifier 20 so that the voltage difference at the amplifier inputs (terminal 11 and line 17) is reduced toward zero. When $V_0 = V_P$ by combination $k_4(I_T-4)^2 = k_1 \Delta P$, which can be rewritten as $I_T = (k_1/k_4 \Delta P)^{1/2} + 4$. By proper scaling of the constants $k_1$ and $k_4$ is a known manner by selection of circuit components, the current $I_T$ may then be made to vary between 4 and 20 ma as a linear function of flow sensed by the transducer over the flow range of interest. The current $I_T$ varies as the square root of $\Delta P$, which as explained, is proportional to the flow across an orifice.

A detailed circuit is shown in FIG. 2, which shows a circuit suitable for providing a 4–20 ma current signal in response to a maximum transducer output signal of about 400 millivolts. Other ranges could be accommodated through appropriate scaling. The circuit of FIG. 2 shows details of a squaring circuit especially suitable for this application where the lower current limit of 4 ma requires use of low power consuming elements. This circuit also includes a "switchover" feature which switches the output signal from a square root relation to the input signal to a linear output signal in relation to the input below a predetermined low input signal value down to a zero value. The switch over feature is desirable since the rate of change of the square root function would be theoretically infinite at the transducer zero value and would be impossible to accommodate. Also, at lower values the linear output is sufficiently accurate for normal operation.

FIG. 2 shows the same transducer 10 with energization terminals 12 and 13 and output signal terminal 11 as was shown in FIG. 1. In this FIG. 2 circuit two main current supply lines are shown, a line 31 connected to the positive side of a Zener reference diode 32, and a line 33 connected to the positive side of a Zener reference diode 34. A resistor 35 is connected between lines 31 and 33 so that substantially constant current flows through diode 34, thereby providing a precise voltage level on line 33. Line 31 is connected to terminal 12 and line 36 is connected to terminal 13. The negative sides of diodes 32 and 34 are also connected to line 36. A differential input comparison amplifier 38 and a current control amplifier 90 are used, and as shown are similar in function to amplifiers 30 and 20 respectively of FIG. 1. Amplifier 38 compares the transducer output signal on a line 39 to an output signal on a line 41 from a computational circuit indicated generally at 40 and the output of amplifier 38 also provides a control signal to amplifier 90 to vary the total current $I_T$ under control of the amplifier 38. Resistors 42 and 43 and a capacitor 44 connected as shown at the inputs of amplifier 38 are noise suppression components.

Amplifier 38 is energized by power inputs connected between lines 31 and 36 and has its output connected through a resistor 45 to the base of a transistor 47 which acts as a first stage current regulator. The collector of transistor 47 is connected to the base of a transistor 48, which is the main current regulator. The emitter of transistor 48 is connected through a reverse voltage protection diode 49 to main power or current input terminal 23 and the collector of transistor 48 is connected to line 31. A "turn-on" resistor 51 is connected across the emitter and collector of transistor 48. A FET 52 is connected between the emitter of transistor 47 and line 36 and has its gate connected through resistor 53 to line 31. FET 52 is a turn-on aid and also acts as an emitter resistance for transistor 47.

The "switch out" circuitry for the squaring circuit is shown at the left of FIG. 2. An amplifier 55 is energized between lines 31 and 36 and has its inverting input connected to the output of transducer 10 at terminal 11 and its non-inverting input connected to the wiper of potentiometer 56. Potentiometer 56 is connected between a pair of resistors 57 and 58 and the series combination of resistors 57, 58 and the resistor of potentiometer 56 is connected between lines 33 and 36. Amplifier 55 compares the transducer output voltage at terminal 11 to a reference voltage established at the wiper of potentiometer 56 and provides an output signal through resistor 59 to the gate of a FET 60. The source of FET 60 is connected to the wiper of a potentiometer 61. Potentiometer 61 is connected between resistors 62 and 63. This combination of resistances (61, 62 and 63) comprises a voltage divider connected between line 33 and junction 64.

A first feedback resistor 65 is connected between junction 64 and line 36 and a second feedback resistor 66 is connected between junction 64 and the current output terminal 22. The drain of FET 60 is connected to line 41 so that when FET 60 is conducting in response to a negative output from amplifier 55, the wiper of potentiometer 61 is effectively connected to line 41. The negative output from amplifier 55 is established by the voltage value at the wiper of potentiometer 56 compared to the transducer output voltage at terminal 11.

In the example of FIG. 2 the transducer output voltage ranges from zero to a full scale negative value as the condition being measured goes through its full range. The wiper of potentiometer 56 may be set to provide a threshold voltage at one input of amplifier 55 so that FET 60 will be turned on when there is a transducer signal of zero and will turn off at a desired threshold point, which may be represented, for example, by an increase in the transducer output voltage (in the negative sense) of 10 percent of the full scale range. When FET 60 is conducting the voltage at the wiper of potentiometer 61 is applied to the input of amplifier 38 where a comparison is made to the transducer output voltage. This voltage is the dominant signal on line 41 at the range where FET 60 is turned on. This signal therefore is the signal which is the controlling signal at the associated input of amplifier 38. Any difference in voltage at the inputs of amplifier 38 is amplified and used as a control signal applied to the input of amplifier 90, thereby causing a changed current $I_T$ to flow under control of amplifier 38. The change in current from a change input signal on line 39 in relation to a signal on line 41 provides a new signal at junction 64 and hence line 41 through resistor 63 and the wiper of potentiometer 61 in linear relation to the output control signal from amplifier 38 and in the proper sense to reduce the difference voltage at the inputs of amplifier 38 to zero. Hence, the current $I_T$ is substantially linearly related to the transducer output at low values of transducer output (when FET 60 is on) in the absence of other active responses. This feature is provided to give a smooth circuit action at low values of transducer signal level where an exact square root extraction would not be practical and where a linear relation between the transducer output and $I_T$ is sufficiently precise.

The relation between transducer output voltage $V_P$ (which in this case is measured between terminals 11 and 13) and total current $I_T$ for this linear operation of the circuit is:

$$I_T = V_R (R_2 + R_f)/(R_1 R_f) - V_P (R_1 + R_2 + R_f)/(R_1 R_f)$$

where $R_1$ is resistor 62 plus that portion of potentiometer 61 above the wiper, $R_2$ is resistor 63 plus that portion of potentiometer 61 below the wiper, $R_f$ is feedback resistor 65 and $V_R$ is the voltage between lines 33 and 36.

As the output signal of amplifier 55 increases as a result of increasing transducer output, FET 60 is cut off, or is switched off to disconnect the wiper of potentiometer 61 from line 41, above the threshold level, and the linear operation is stopped and the squaring circuit 40 output will be applied to line 41 leading to one input of the comparison amplifier 38.

The output of amplifier 55 is also connected to a junction 69 to provide energization to an amplifier 70 used in squaring circuit 40. Power return for amplifier 70 is connected to line 36. A light emitting diode portion 80A of diode-photoresistor element 80 is connected between junction 60 and the output terminal of amplifier 70. A holding capacitor 68 is connected between the output terminal of amplifier 70 and the inverting input terminal of this amplifier. The non-inverting input to amplifier 70 is connected through a resistor 71 to a junction 72. A resistor 73 is connected between junction 72 and current terminal 22, which is also connected through resistors 66 and 65 to line 36. A resistor 74 is connected between junction 72 to line 33.

Two additional voltage dividers are used in the computation of squaring circuit 40. A resistor 75 is connected from line 33 to junction 76, and also is connected to a resistor 77 which has its opposite end connected to line 36. A resistor 78 is connected from line 33 to a junction 79, and also to a resistor 81 which has its opposite end connected to line 36. One end of a photosensitive resistor 85 (also called photoresistor) of the diode-photoresistor element 80 is connected to junction 79 and is also connected to first ends of a pair of FET switches 86 and 87. The other end of photoresistor 85 is connected to first ends of a second pair of FET switches 88 and 89. The other end of switch 86 is connected to line 41; the other end of switch 87 is connected to the inverting input terminal of amplifier 70; the other end of switch 88 is connected to junction 76; and the other end of switch 89 is connected to junction 72. A holding capacitor 92 is connected between line 41 and line 36. A flip flop circuit 91 is energized between line 31 and line 36 whenever energization power is applied to the circuit and has an output A connected to switches 87 and 88 at the gates of these switches, which are labeled "A" in FIG. 2, and an output B of the flip flop is connected to switches 86 and 89 at the gates of these switches, labeled "B" in FIG. 2. The flip flop can be of any desired construction but preferably is a low current, integrated circuit providing a square wave symmetrical output whenever the circuit is energized.

Flip flop 91 alternately switches each of the output terminals A and B to the "on" state while the other is "off", thereby effectively putting photoresistor 85 alternately in two different circuits through the FET switches 86–89. When output A is energized, the gates of FET switches 87 and 88 are at a level wherein these FETS conduct and a current path is established from junction 79 through photoresistor 85 to junction 76. In this state of the FET switches 86 and 89 do not conduct. The voltage at junction 72 feeding the noninverting input of amplifier 70 is proportional to $I_T$ and, following the previous example of 4–20 ma design, may be $V_1 = K_2(I_T - 0.004) + V_R/2$ by proper scaling of the resistors 73 and 74 and the feedback resistors 65 and 66, which act as one feedback resistor when the FET 60 is switched off. In these equations 0.004 is used to indicate the 4 ma energization current.

Thus with the FET's 87 and 88 conducting and FET's 86 and 89 turned off during one state of the flip flop with respect to the potential on line 36, the voltage $V_1$ at junction 72 is $V_1 = V_R (R_{73} + R_F)/(R_{73} + R_{74} + R_F) - I_T R_F (R_{74})/(R_{73} + R_{74} \ 30 \ R_F)$ Where $I_T$ is the total current, $V_R$ is the regulated voltage provided by Zener diode 34 and $R_F$ is the sum of feedback resistors 65 and 66. The numerals adjacent the symbols in this equation indicate the resistor number in FIG. 2.

For a description of the squaring operation for the circuit of FIG. 2 assume first that flip flop 91 has closed the A switches 87 and 88 and the B switches 86 and 89 are open or off. Then amplifier 70 has the voltage $V_1$ applied to its non-inverting input terminal. The inverting input terminal of amplifier 70 receives an input through switch 87 from junction 79 summed with another input signal from junction 76 through switch 88 and photoresistor 85, and also through switch 87. Resistor 78 may be conveniently selected to be equal to resistor 81 so the voltage at junction 79 is $V_R/2$. Resistors 73, 74 and $R_F$ (resistors 65 and 66) are selected so that when $I_T = 4$ ma, the designed energization current, $V_1 = V_R/2$ and therefore $V_1 = V_R/2 - K_3(I_T - 0.004)$ where $K_3 = R_F \ R_{74}/R_{73} + R_{74} + R_F$ The gain of amplifier 70 is high and the amplifier forces the voltages at its inputs toward equal values by changing the value of photoresistor 85 through intensity variation of the light source comprising light emitting diode (LED) 80A. The intensity of the LED 80A is controlled by the output of the amplifier 70. Equality of the input voltages to amplifier 70 requires that $K_3 [I_T - 0.004] = R_X V_R$ where $R_X$ is dependent upon the value ($R_{85}$) of variable photoresistor 85 in addition to fixed resistors 75, 77, 78 and 81. The expression for $R_X$ is:

$$R_X = \frac{\left(\frac{R_{78}R_{81}}{R_{78}+R_{81}}\right)\left(\frac{R_{81}}{R_{78}+R_{81}} - \frac{R_{77}}{R_{75}+R_{77}}\right)}{\frac{R_{78}R_{81}}{R_{78}+R_{81}} + \frac{R_{75}R_{77}}{R_{75}+R_{77}} + R_{85}}$$

On the opposite switch cycle of the flip flop operation, the switch 87 and 88 are open and the switches 86 and 89 are closed. The voltage at the inverting terminal of amplifier 70 is maintained substantially constant since its only active connection in this opposite cycle is to holding capacitor 68. Capacitor 68 is charged during the time switches 87 and 88 are closed. Voltage $V_1$ is now applied through switch 89 to photoresistor 85, thence through switch 86 to line 41 which connects to the noninverting input terminal of amplifier 38. The voltage on line 41 is designated $V_2$. Line 41 is also connected through switch 86 to junction 79. Analysis of the circuit gives:

$V_2 = V_R/2 - R_Y [K_3 I_T - K_6 V_R]$ where $R_Y$ is dependent upon the value of the variable photoresistor 85 in addition to fixed resistors 78, 81, 73, 74 and $R_F$. The ratio $R_Y$ is expressed as $$R_Y = \frac{\frac{R_{78}R_{81}}{R_{78}+R_{81}}}{\frac{R_{78}R_{81}}{R_{78}+R_{81}} + \frac{R_{74}(R_{73}+R_F)}{R_{73}+R_{74}+R_F} + R_{85}}$$

The constant $K_6$ is a function of resistors 73, 74 and $R_F$ (resistors 65 and 66). Following the example for a 4–20 ma operation, $V_2 = V_R/2$ when $I_T = 4$ ma. Then the equation for $V_2$ is $$V_2 = V_R/2 - K_3 R_Y [I_T - 0.004]$$

By selection $R_X$ may be made equal to $R_Y$ and then it follows that $$V_2 = V_R/2 - K_3^2/K_4 V_R [I_T - 0.004]^2$$

where $K_4$ is a function of fixed resistors 75, 77, 78 and 81.

The transducer 10 provides a voltage $V_P$ which is compared at amplifier 38 to the voltage $V_2$, which is the output of the squring circuit when switches 86 and 89 are closed. Amplifier 38 causes a changed current $I_T$ to flow in response to any difference between voltages $V_P$ and $V_2$ (the voltage inputs to the amplifier 38) to reduce the difference in these voltages to zero. The output signal from amplifier 38 connects to control the current control amplifier 90, and the output of amplifier 38 is responsive to the signals at its inputs. The voltage $V_P$ with respect to line 36 may be expressed as:

$$V_P = V_R/2 - K_5 \Delta P$$

where the transducer is responsive to a differential pressure $\Delta P$ and $K_5$ is a transducer proportionality constant derived from performance of the transducer. Then by combining the expressions for $V_2$ and $V_P$ it may be seen that $$(I_T - 0.004) = K_7 \sqrt{\Delta P}$$

where $K_7$ is a proportionality constant that also can be calculated. The total current over 4 ma thus is proportional to the square root of the differential pressure sensed.

The holding capacitor 92 is connected between line 36 and line 41, and the signal $V_2$ will be held on the line 41 leading to one input of amplifier 38 by capacitor 92 when the flip flop again goes to its previous state where switches 87 and 88 close and switches 86 and 89 open.

The circuit of FIG. 2 provides a square root extraction for current transmitter circuits operating in the 4–20 ma range. This operation is possible since all portions of the circuit operate at low power levels. The squaring circuit described in FIG. 2 is especially important in this application, since it provides a highly precise squaring function while using a minimum amount of power. The use of a single lower power light source and a single photoresistor is very important to successful performance in the current range of 4–20 ma.

Actual component values which may be used for the circuit of FIG. 2 are given in Table 1, which is at the end of this specification. The frequency of the flip flop is about 1 Khz. The transmitter is designed to be energized by a power supply of between 14 and 45 VDC.

Figure 3:
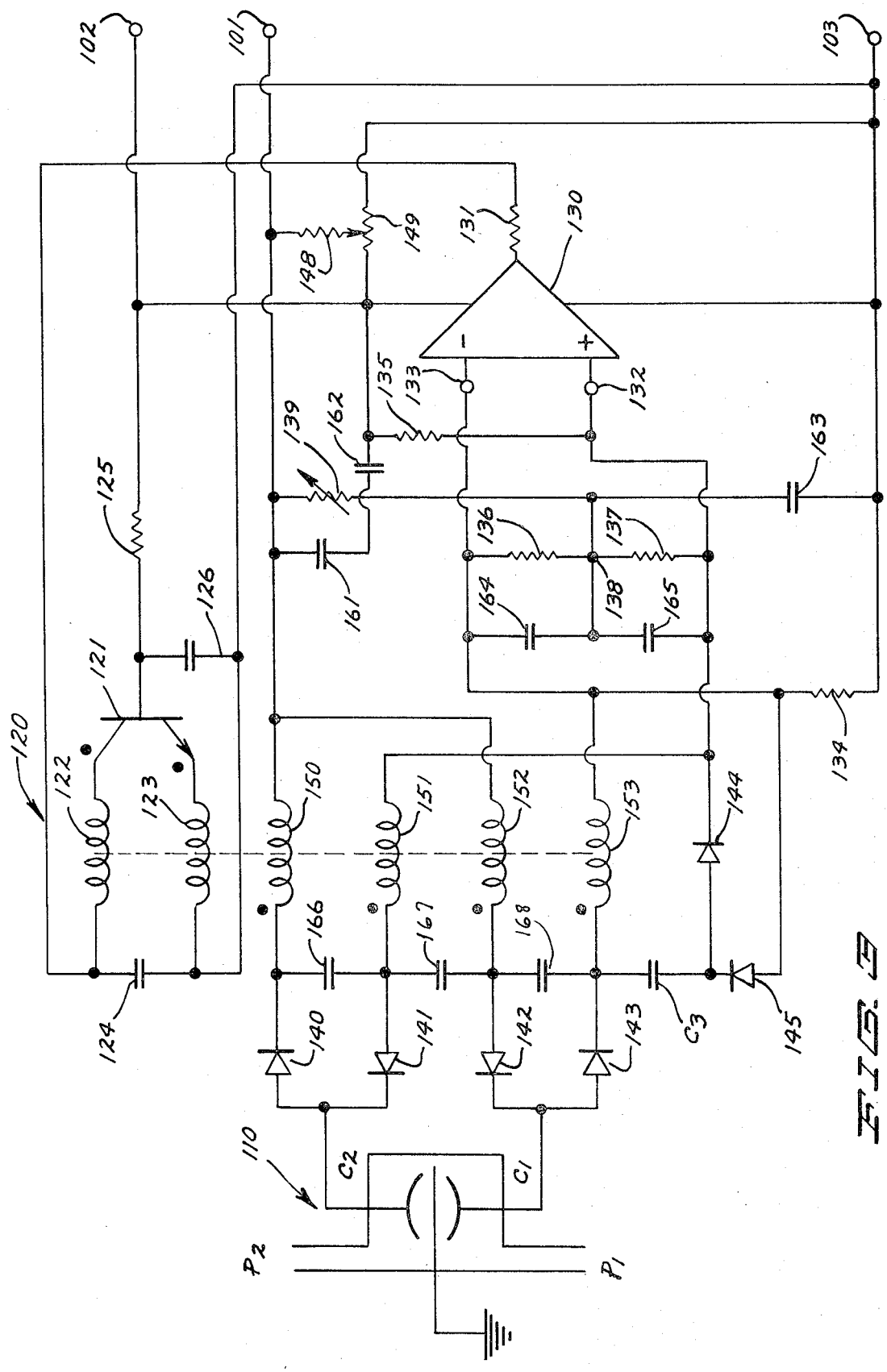
FIG. 3 is a schematic representation of an appropriate transducer circuit used in connection with the circuits of FIGS. 1 and 2.

The circuit of FIG. 2 having component values as given in Table 1 has approximately 1.6 ma available for the transducer 10 and works well with a transducer output signal at terminal 11 varying between zero and a negative 400 millivolts. An example of such a transducer is shown in FIG. 3 where the circuit is designed to connect to the circuit of FIG. 2 by connecting terminals 101, 102 and 103 to terminals 11, 12 and 13 respectively. This circuit of FIG. 3 defines a $\Delta P$ sensor having a diaphragm moving between fixed capacitor plates and is similar to that described in U.S. Pat. No. 3,646,538, issued to Roger L. Frick on Feb. 29, 1972 and assigned to the same assignee as this invention and incorporated herein by a reference.

The $\Delta P$ mechanical assembly is shown schematically at 110 and comprises capacitors $C_1$ and $C_2$ each of which varies in capacitance in opposite sense from the other with a change in differential pressure. An oscillator 120 comprising a transistor 121 is powered from amplifier 130 which is energized from power between terminals 102 and 103. The output of amplifier 130 is connected through damping resistor 131 to a first end of a primary winding 122. The other end of winding 122 connects to the collector of transistor 121. A feedback winding 123 is connected at a first end to terminal 103 and through a filter capacitor 124 to the first end of winding 122 and at the other end to the emitter of transistor 121. The base of transistor 121 is connected through a DC bias resistor 125 to terminal 102. A decoupling capacitor 126 is connected between the base of transistor 121 and the first end of winding 123. Capacitor $C_2$ is connected through forward conducting diode 140 to a first end of an inductive winding 150 and is also connected through reverse conducting diode 141 to a first end of a winding 151. Capacitor $C_1$ is connected through reverse conducting diode 142 to a first end of a winding 152 and is also connected through forward conducting diode 143 to a first end of a winding 153. The first end of winding 153 is also connected to a first side of a capacitor $C_3$. The other side of capacitor $C_3$ connects through a forward conducting diode 144 to the noninverting input terminal 132 of amplifier 130 and through a reverse conducting diode 145 to the inverting terminal 133 of amplifier 130. The second ends of windings 150 and 152 connect to signal output terminal 101. The second end of winding 151 connects to terminal 132 and the second end of winding 153 connects to terminal 133. Resistor 134 is connected between terminal input 133 of amplifier 130 and terminal 103 and a resistor 135 is connected between input terminal 132 of amplifier 130 and terminal 102 and these two resistors 134 and 135 provide reference currents for summing at the input terminals to amplifier 130. A resistor 136 is connected between input terminal 133 and a junction 138, and a resistor 137 is connected between input terminal 132 and the junction 138 and these two resistors 136, 137 complete the current summing circuit for currents from the capacitances $C_1$, $C_2$ and $C_3$. A variable resistor 139 is connected between junction 138 and terminal 101 and provides a span adjustment for the transducer. A potentiometer 149 is connected between terminals 102 and 103 and the wiper of potentiometer 149 is connected through a resistor 148 to terminal 101, to provide a zero bias voltage. Filter capacitors are used to complete AC current paths in the transducer and are shown as a capacitor 161 connected across resistor 139; a capacitor 162 connected between junction 138 and terminal 102; a capacitor 163 connected between junction 138 and terminal 103; a capacitor 164 connected between terminal 133 and junction 138 and a capacitor 165 connected between terminal 132 and junction 138. Filtering between the secondary windings 150–153 is provided by a capacitor 166 connected between the first ends of windings 150 and 151; a capacitor 167 connected between the first ends of windings 151 and 152 and a capacitor 168 connected between the first ends of windings 152 and 153.

Operation of the circuit of FIG. 3 is similar to that described in U.S. Pat. No. 3,646,538, so that each of the secondary windings 150–153 together with its associated diode 140–143 and capacitor $C_1$ or $C_2$ provides a DC signal of a $\pm CVf$ depending on the relative polarity of the associated diode. A zero differential in input to amplifier 130 requires that the product of frequency and amplitude of the oscillator 120 is proportional to $(C_1 + C_2 - 2C_3)^{-1}$. Voltage V is the peak to peak excitation voltage on the secondary windings 150–153 and $f$ is the oscillator frequency. Then the voltage at terminal 101 is proportional to $(C_1 - C_2)Vf$ or $(C_1 - C_2) / (C_1 + C_2 - 2C_3)$ which expression shows a linear relation in output in response to differential pressure sensed at $P_1$ and $P_2$ when used with pressure sensors such as described in U.S. Pat. No. 3,646,538. A list of components which may be used for the circuit of FIG. 3 is given in Table II which follows Table I and the circuit does provide an output of approximately 400 mv on an excitation current of 1.6ma and where $C_1-C_2$ varies about 150 Pf.

The output signal from the circuit of FIG. 3 is linear with respect to the differential pressure sensed and the signal is used as the input signal to the transmitter as previously described.

It should also be noted that the use of a single photosensitive resistor 85 which is alternately coupled to the amplifier 70 and to the output of the squaring circuit eliminates problems from temperature variation or light variation which would be present if circuits using two separate but identical photoresistors were used. However, where such factors are not critical the circuit can be modified to use two separate photoresistors.

While the specific example of the transducer herein is for differential pressure, the input signal can be from any type of transducer from which a square root extraction is desired. For example; a signal from a temperature transducer.

TABLE 1

| COMPONENT | (FIG. 2 Components) SYMBOL (NUMBER) | VALUE AND/OR TYPE |
|---|---|---|
| Capacitors | 92,68 | .22 μf |
|  | 44 | .001 μf |
| Resistors | 57,58,78,81 | 35K (All in Ohms) |
|  | 56 | 2K |
|  | 59 | 10M |
|  | 62 | 19K |
|  | 63,73 | 20K |
|  | 61 | 1K |
|  | 74 | 17K |
|  | 71 | 47K |
|  | 66 | 100 |
|  | 65 | 40 |
|  | 75 | 40K |
|  | 77,45 | 10K |
|  | 42,43,53 | 68K |
|  | 35 | 1.4K |
|  | 51 | 18K |
| Photoresistor & LED | 85 and 80A | VACTEC VTL2C3 |
| Diodes | 49 | 1N4003 |
|  | 32 | 1N2620 9 Volt |
|  | 34 | 1N4571 6.3 Volt |
| Transistors | 60 | 2N4360 |
|  | 47 | 2N2222 |
|  | 48 | 2N4920 |
|  | 52 | 2N5465 |
| Integrated Circuits | 91 | RCA CD4007 AE |
|  | 88,89,87,86 | RCA CD4016 AE |
|  | 38,55 | Precision monolithics 741-056 |
|  | 70 | Fairchild 741C |

TABLE 2

| COMPONENT | (FIG. 3 Components) SYMBOL (NUMBER) | VALUE AND/OR TYPE |
|---|---|---|
| Capacitors | 126 | .01 μf |
|  | 124,161,164,165,166, 167,168 | .1 μf |
|  | 162,163 | 1 μf |
| Resistors | 125 | 68K (All In Ohms) |
|  | 131 | 12 |
|  | 134,135 | 18K |
|  | 136,137 | 1K |
|  | 139,149 | 20K |
|  | 148 | 200K |
| Diodes | 140,141,142,143,144, 145 | 1N914 |
| Transistors | 121 | 2N3903 |
| Amplifier | 130 | Precision Monolithics 741 I.C. Operational Amplifier |
| Transformer Windings | 122 | Primary - 55 turns |
|  | 123 | Feedback - 5 turns |
|  | 150,151,152,153 | Secondary - 200 turns Quadfiler wound; Core 768T188-3D3-Ferroxcube |

What is claimed is:

1. A two wire current transmitter having first and second terminals for connection to a power source and to deliver a current signal proportional to the square root of a parameter including first means to provide an input signal which varies as a function of the parameter, a current control circuit providing a variable output current signal in response to a control signal, a squaring circuit having input means providing a first current signal which is a function of said variable output current signal and including second means providing a second signal proportional to the square of said first current signal, a comparison amplifier having an input coupled to the first means and second means and having an output providing a control signal which is a function of the input signal and the second signal, and means connecting the output of said comparison amplifier to provide said control signal to said control circuit and means connected to said first means, said control circuit, said squaring circuit and said comparison amplifier, respectively, to provide power therefore solely through said first and second terminals.

2. A transmitter to deliver a signal proportional to the square root of a parameter including first means to provide an input signal, a control circuit providing a variable output signal in response to a control signal, a squaring circuit having input means providing a first signal which is a function of said variable output signal and including second means providing a second signal proportional to the square of said first signal, a comparison amplifier having an input coupled to the first means and the second means and having an output providing a control signal which is a function of the input signal and second signal, means connecting the output of said comparison amplifier to provide the control signal to said control circuit, switch means, means connecting a first side of said switch means to one input of said comparison amplifier, means connected to the second side of said switch means to provide a signal which is a function of the variable output signal, and means responsive to said input signal to close said switch means to connect the first and second sides thereof when the input signal is below a desired level.

3. A transmitter to deliver a signal proportional to the square root of a parameter including first means to provide an input signal; a control circuit providing a variable output signal in response to a control signal; a squaring circuit having input means providing a first signal which is a function of said variable output signal and including second means providing a second signal proportional to the square of said first signal comprising photosensitive resistance means connected in circuit so that the value of said photosensitive resistance means affects said second signal, a light source, the intensity of which is variable to correspondingly change the value of said photosensitive resistance means, and means controlling said light source so as to change the intensity thereof as a function of said variable output signal and the value of the photosensitive resistance means; a comparison amplifier having an input coupled to the first means and second means and having an output providing a control signal which is a function of the input signal and the second signal; and means connecting the output of said comparison amplifier to provide said control signal to said control circuit.

4. A transmitter to deliver a signal proportional to the square root of a parameter including first means to provide an input signal, a control circuit providing a variable output signal in response to a control signal, a squaring circuit having input means providing a first signal which is a function of said variable output signal and including second means providing a second signal proportional to the square of said first signal, said squaring circuit comprising a photosensitive resistance means and a variable intensity light source, the intensity of which controls the value of said photosensitive resistance means, a circuit amplifier having first and second inputs and an output controlling the intensity of said light source, a first input of said circuit amplifier being connected to said input means to receive said first signal, said input means further comprising means providing a signal to a second input of said circuit amplifier which is a function of the value of said photosensitive resistance means, said circuit amplifier adjusting the intensity of said light source to change the value of said photosensitive resistance means to balance the signals at the first and second inputs to said second amplifier, said photosensitive resistance means further comprising a portion of the second means so that said second signal is also a function of said photosensitive resistance means; a comparison amplifier having an input coupled to the first means and second means and having an output providing a control signal which is a function of the input signal and the second signa; and means connecting the output of said comparison amplifier to provide said control signal to said control circuit.

5. The transmitter of claim 4 wherein said photosensitive resistance means comprises a single photosensitive resistor, and switching means to alternately couple said photosensitive resistor to an input of said second amplifier and to said second means.

6. The transmitter of claim 1 wherein said input means comprises a feedback signal producing means coupled to be sensitive to the change in the variable output signal.

7. The transmitter of claim 1 wherein said first means comprises a transducer delivering a signal substantially linear with respect to measured pressure differentials in a flowing fluid.

8. The transmitter of claim 4 wherein said first means comprises a capacitance type differential pressure transducer providing an output signal substantially linear with respect to a measured differential pressure.

9. The transmitter of claim 4 wherein said photosensitive resistance means comprises a photosensitve resistor, and first and second resistance networks, switch means to alternately switch said photosensitive resistor into said first and second resistance networks, said first resistance network being coupled with said photosensitive resistor to said second amplifier and said second resistance network comprising at least a portion of said second means and being coupled to said comparison amplifier, said first and second resistance networks being coupled to said switch means to uncouple one network from said photosensitive resistor when the other network is coupled to said photosensitive resistor.

10. The transmitter of claim 9 wherein said transmitter includes power source means for said first and second resistance networks, said first and second resistance networks each having a source impedance and including resistors selected and coupled whereby the source impedances of said first and second networks, when coupled to the photosensitive resistor, are substantially equal at the second amplifier and comparison amplifier respectively.

11. The transmitter of claim 10 wherein said first resistance network comprises a portion of the input means to said squaring circuit.

12. A transmitter to deliver a signal proportional to the square root of a variable input signal, comprising a pair of terminals adapted to provide connection to a power source for said transmitter, a current control amplifier means having a current control input and providing a variable value output current signal through said terminals in response to a control signal at said current control input, a square circuit powered only through said terminals including means responsive to said output current signal to provide a second signal which is proportional to the square of said output current signal, signal comparison means powered only through said terminals including means to sense a difference between said input signal and said second signal and having an output means to provide an output control signal which is a function of said input signal and said second signal, and means to couple the output means of said signal comparison means to said current control input to provide said control signal thereto for controlling the output current signal value and thereby changing the value of said second signal in response to changes of said variable input signal.

13. The transmitter of claim 12 wherein said means to provide a connection to a power source comprises a pair of terminals, said terminals carrying the power for the transmitter and the variable output current signal.

14. The transmitter of claim 13 wherein said squaring circuit includes a light source and a photosensitive resistor responsive to the light source, means controlling the intensity of said light source as a function of said output current signal and a dependent signal, a first network coupled in circuit to provide said dependent signal, a second network coupled in circuit to provide said second signal, and means to alternately connect said photosensitive resistor into said first network and into said second network to thereby change the light intensity and the second signal as a function of the photosensitive resistor value and the output current signal.

15. The transmitter of claim 14 wherein said first and second networks each include resistors selected so that the source impedance of each network is substantially equal when photosensitive resistor is connected in the respective network.

16. A circuit for providing a square root extraction of a substantially linear input signal including amplifier means to provide a variable output signal in response to a control signal, feedback means to provide a feedback signal which is a function of said variable output signal, a photosensitive resistor, a variable intensity light source for controlling the resistance of said photosensitive resistor, first means to control the intensity of said light source as a function of said feedback signal and a second signal, a first network coupled to provide said second signal, a second network coupled to provide a third signal, means to alternately couple said photosensitive resistor into said first network and said second network, respectively, the resistance of said photosensitive resistor and said feedback signal thereby affecting the intensity of said lamp and the resulting impedance of said second network, whereby the third signal is proportional to the square of said output signal, and means connected to said second network to compare said third signal and said input signal and to provide said control signal to said amplifier means as a function of the input signal and the third signal.

17. The circuit of claim 16 wherein said first and second networks each have source impedances, and said networks include resistors selected to provide substantially equal source impedances when said photosensitive resistor is coupled into the respective network and is of a substantially constant value in each network.

18. The circuit of claim 17 and means to maintain the second signal substantially constant when the photosensitive resistor is coupled to the second network, and means to maintain the third signal substantially constant when the photosensitive resistor is coupled to said first network.

19. The transmitter of claim 1 wherein said squaring circuit input means comprises a current sensitive resistance network connected between said terminals to sense total current through said terminals.

20. The transmitter of claim 1 wherein said squaring circuit input means comprises current sensing means including a voltage divider connected to said squaring circuit, a series combination of a resistance and voltage reference element connected between said terminals, and means to connect said voltage divider in parallel with said series combination.

21. The combination as specified in claim 1 wherein said first means comprises a transducer sensitive to variable physical parameters, and wherein said means connected to provide power to said first means, said squaring circuit and said comparison amplifier includes a voltage reference element connected between said terminals.

22. The transmitter of claim 1, wherein said first means comprises a capacitance type pressure transducer providing an output signal substantially linear with respect to a measured pressure.

23. The transmitter of claim 22 wherein said capacitance type pressure transducer comprises at least one capacitor, an excitation source for said capacitor powered through said terminals comprising an oscillator, means connecting said oscillator to said capacitor including DC coupling means providing DC signals as a function of the capacitance of said capacitor, and means responsive to said DC signals to provide said input signal.

* * * * *

PO-1050
(5/69)

UNITED STATES PATENT OFFICE
CERTIFICATE OF CORRECTION

Patent No. 3,854,039            Dated December 10, 1974

Inventor(s) Leonardo V. Serrano

It is certified that error appears in the above-identified patent and that said Letters Patent are hereby corrected as shown below:

Column 2, line 27 "operation" should be--operational--. Column 5, line 3 "60" should be--69--; Column 5, line 64 for the "30" before the quantity "$R_F$", should read--+-- (plus). Column 7, line 11 "squring" should be--squaring--.

Signed and sealed this 11th day of February 1975.

(SEAL)
Attest:

RUTH C. MASON
Attesting Officer

C. MARSHALL DANN
Commissioner of Patents
and Trademarks